June 12, 1956     H. W. BUUS     2,750,035
MAGNETIC SEPARATOR PULLEY

Filed Oct. 19, 1954

INVENTOR.
HAROLD W. BUUS
BY
Wheeler, Wheeler & Wheeler
ATTORNEYS

United States Patent Office 2,750,035
Patented June 12, 1956

2,750,035

MAGNETIC SEPARATOR PULLEY

Harold W. Buus, Hales Corners, Wis., assignor to Stearns Magnetic Inc., Milwaukee, Wis., a corporation of Wisconsin Application October 19, 1954, Serial No. 463,184

4 Claims. (Cl. 209—219)

This invention relates to a magnetic separator pulley.

The invention seeks to provide a magnetic pulley with unusual depth of field and with minimum flux loss through the supporting shaft.

The capacity of an electromagnetic separator can be increased only by increasing the loading of the belt or by increasing the rate of belt travel. There are practical limits on belt speed making it desirable to stay below 350 feet per minute. Also there are minimum time intervals for which tramp iron should be exposed to the magnetic field for proper separating action. To achieve the requisite duration of exposure it is necessary to increase the diameter of the pulley as the belt speed is increased. Since an increase in pulley diameter does not result in increased strength or depth of field, the much greater expense of the pulley of large diameter is not compensated by an increase in effectiveness.

Belt loading can be increased only by increasing the width of the belt and the corresponding width of the electromagnetic head pulley. The present invention has particular application to axially elongated pulleys required for use with relatively wide belts. In all wide pulleys, heating is a problem. There are practical limits to the dimensions of the windings which can be employed without overheating. Accordingly, the need for extra long pulleys has conventionally been met by simple adding additional coil sections. This results in considerable loss of energy by flux leakage through the pulley shaft. Also, it results in a field which is relatively flat as viewed on the axial section of the pulley and therefore fails to reach adequately the greater depth to which the material may be piled on a wide belt traversing the pulley for magnetic separation purposes.

Study of the gauss pattern of the magnetic field shows that its depth is influenced almost entirely by pulley width, number of coils and the number of poles and intervening coil pockets. Diameter is not a factor except that, other things being equal, a small diameter pulley for a wide belt width will have a very slightly less depth of field than a large diameter. Even in pulleys of small diameters, a pulley having three poles and two coil pockets will show great superiority in depth and contour of magnetic field to a three coil pulley. If a field of 500 gauss intensity is plotted across the surface of a three coil pulley, the line will be nearly parallel to the pulley axis over the entire working surface of the pulley. If a similar line representing a field of 500 gauss intensity is plotted over a three pole pulley having two coil pockets, the field will be of pronouncedly increased depth at the center of the pulley. However, the size of the coil which can be used in a magnetic pulley is limited from a practical standpoint by the problem of dissipating its heat.

In accordance with the present invention, pulley dimensions heretofore reached with a four pole pulley having three coils are achieved with a three pole pulley having two coil pockets in which four coils are used, the two coils in each pocket being separated by heat conductive partitions which may be, and desirably are, non-magnetic, and which therefore carry off the heat without establishing any intervening pole. In consequence of these improvements, the terminal poles are of identical polarity. Since the only support from the shaft is provided at or near the poles, the identical polarity of the terminal poles precludes flux leakage along the shaft. Since there are but three poles, the two coils in each pocket being of like polarity, the depth of field is very great at the center of the pulley and is adequate to take care of any reasonable depth to which the work may be piled on the belt.

The partitions between the coils in the pockets are not part of the pulley casting but are in heat conductive connection with the coil covers. The pulley casting is desirably a low carbon homogeneous dynamo steel. Its heat conductivity is far below that of aluminum. Magnetically the casting has very desirable qualities, but the partitions and coil covers are utilized in the present device as a primary means of carrying off the heat. The pockets and coils may be sub-divided with as many partitions as desired, but the coils are desirably oriented to produce a three-pole pulley.

When crowned pulleys are desired, I provide a special arrangement whereby the poles and partitions are shouldered to provide seats for the coil covers at progressively increasing radius from the two ends of the pulley toward its center, the assembly of pulley and covers being subsequently turned, if desired, to provide a continuously convexly crowned perimeter.

Figure 1:
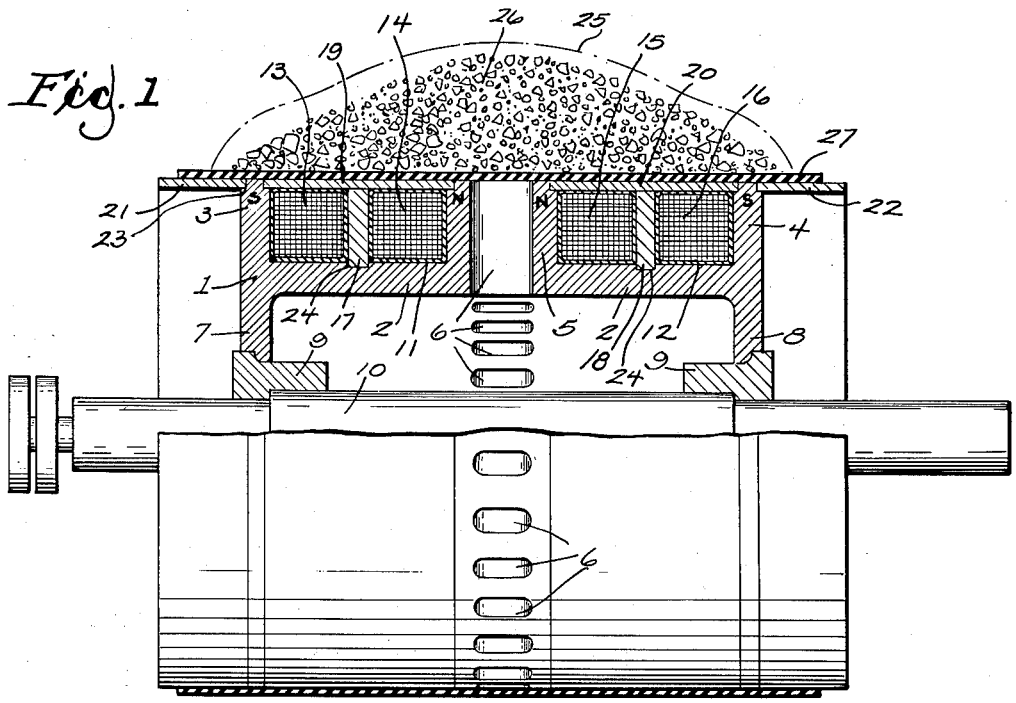
Fig. 1 is a view partially in side elevation and partially in axial section through a separator pulley embodying this invention, the belt and the work being illustrated in section.

The magnetic pulley 1 comprises a tubular intermediate portion 2 provided with terminal polar flanges 3 and 4 an a wide intermediate pole 5 through which ventilating openings 6 extend from the interior to the exterior of the pulley. The terminal polar flanges 3 and 4 are extended inwardly at 7 and 8 to provide support from the bushings 9 mounted on the pulley shaft 10.

Between the terminal polar flanges 3 and 4 and the intermediate polar flange 5 are wide channel shaped pockets 11 and 12. In the channel 11 are the windings 13 and 14. In the channel 12 are the windings 15 and 16. The windings of each pair have like electrical connections and are, accordingly, of like polarity. However, the windings in the channel or pocket 11 are opposite in polarity to the windings in the channel or pocket 12. Assuming the polarity to be such that both sets of windings establish the central pole 5 as a north pole, it will be evident that both of the terminal poles 3 and 4 will be energized as south poles, the intervening tubular portion 2 of the magnet constituting its core. Since the central pole assumed to be a north pole is remote from shaft 10, and since the portions of the pulley directly supported from the shaft are of identical polarity, it will be evident that there will be little or no flux leakage along the shaft.

In order to be able to dispose two coils in one pocket, heat conducting partitions are employed between the coils at 17 and 18 respectively, these partitions being in peripheral heat conductive engagement with coil covers 19 and 20 respectively. While it is broadly immaterial, in some aspects of the invention, whether the partitions 17 and 18 and the coil covers 19 and 20 are magnetic or non-magnetic, I prefer that the partitions be made of such highly heat conductive metal as aluminum or copper to carry off the heat without establishing intermediate poles. The coil covers and the terminal flanges 21, 22 may be seated on shoulders such as those indicated at 23 if desired. The coil receiving channels may also be undercut as shown at 24, if desired, to receive and position the partitions 17 and 18.

As compared with the relatively cylindrical field of the conventional prior art three-coil four pole magnet of comparable external dimensions, it will be observed that the 500 gauss field of the present magnetic pulley, as represented by the broken line 25 in Fig. 1, has great depth over the central pole 5 and is more than adequate to embrace the entire depth to which the material requiring separation may be piled as shown at 26 upon the belt 27.

A number of modifications are possible. With particular reference to cooling, attention is invited to Patents 1,387,879 and 1,384,177.

Figure 2:
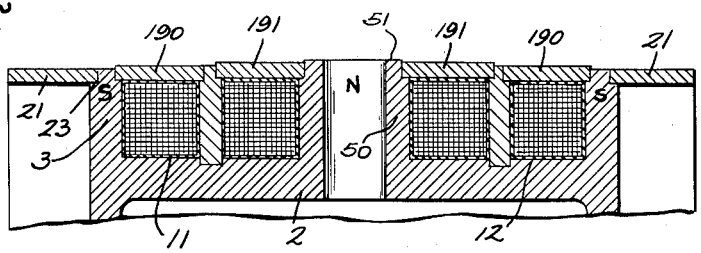
Fig. 2 is a fragmentary detailed view in axial section through a portion of a crowned pulley comprising stepped cylindrical portions.
Figure 3:
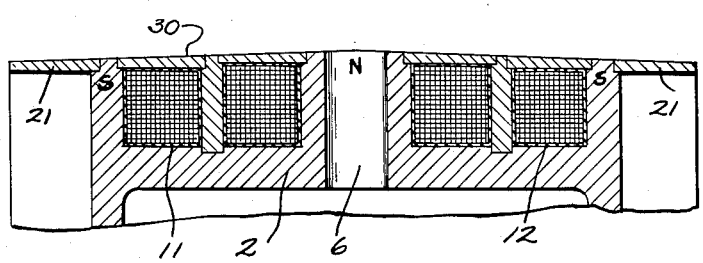
Fig. 3 is a view similar to Fig. 2 showing a pulley continuously convexly crowned by turning down portions of the periphery of the pulley shown in Fig. 2.

With particular reference to crowning of the pulley, reference is made to Figs. 2 and 3. Here the pole 3 and chine flange 21 are essentially identical with that shown in Fig. 1. The pole 50 has increased radial extent. The annular coil covers 190 and 191 are of progressively increasing diameter as compared with the chine flange 21 and they also may be of relatively greater thickness, whereby the exposed peripheral portion 51 of the central pole 50 will be of substantially greater radius than the periphery of the terminal pole 3, thus giving the pulley an effective crown resulting from its stepped cylindrical portions.

In the construction of Fig. 3, the pulley has been made identically as disclosed in Fig. 2 but has been turned, as in a lathe, so that its periphery 30 is uniformly convex in axial section.

What is claimed is:

1. A magnetic separator pulley comprising a one piece tubular core portion having means for mounting it in concentrically spaced relation on a shaft, said core portion having integral terminal polar flanges extending outwardly therefrom and an integral central polar flange on the core portion between the terminal polar flanges aforesaid, the pulley having channels between the central polar flange and the respective terminal polar flanges, annular partitions of heat conductive metal disposed in each of the channels, windings in sets of like polarity disposed in each channel and spaced by the said partitions, the windings at one side of the central polar flange being of opposite polarity from the windings at the other side of the central polar flange, whereby the terminal polar flanges have polarity identical with each other and opposite to the polarity of the central polar flange, coil cover means closing the pulley between the several polar flanges over the several coils and in heat conductive engagement with said partitions, said core portion having mounting means extending inwardly from portions of the core near its respective ends to receive support from said shaft.

2. The pulley of claim 1 in which the partitions are of non-ferrous highly heat conductive material.

3. The device of claim 2 in which the polar flanges and the partitions are shouldered and the coil cover means comprise coil covers individual to the respective coils and seated on said shoulders.

4. A magnetic separator pulley comprising a shaft; a one-piece electromagnetic field structure comprising a tubular core of magnetic material spaced concentrically from said shaft, said core having integral terminal polar flanges on the respective ends of said core, an integral central polar flange intermediate said terminal polar flanges, support flanges to mount said field structure from said shaft, annular channels between the respective terminal polar flanges and central polar flange; heat conductive partitions sub-dividing each channel into dual sub-channels; annular field windings comprising sections of like polarity in respective sub-channels at opposite sides of said partitions; means for energizing said windings to impart corresponding polarity to said terminal polar flanges and opposite polarity to the central polar flange whereby the magnetic fields produced by said windings combine in said central polar flange to produce a flux pattern over said pulley which is stronger over its center than over its ends, and heat conductive channel closures over said windings and in heat conductive engagement with said partitions, whereby heat generated in said windings is dissipated by said partitions.

References Cited in the file of this patent

UNITED STATES PATENTS

| 1,527,810 | Manegold | Feb. 24, 1925 |
| 2,680,517 | Koerner | June 8, 1954 |

FOREIGN PATENTS

| 687,527 | France | Aug. 9, 1930 |